United States Patent
Liu et al.

(10) Patent No.: US 11,895,244 B2
(45) Date of Patent: Feb. 6, 2024

(54) SECURE HIGH-SPEED COMMUNICATION INTERFACE BETWEEN A BASIC INPUT AND OUTPUT SYSTEM AND A SERVICE PROCESSOR

(71) Applicant: Dell Products L.P., Round Rock, TX (US)

(72) Inventors: Wei G Liu, Austin, TX (US); PoYu Cheng, Tainan (TW)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 17/385,972

(22) Filed: Jul. 27, 2021

(65) Prior Publication Data

US 2023/0034670 A1  Feb. 2, 2023

(51) Int. Cl.
*H04L 9/32* (2006.01)
*H04L 9/08* (2006.01)

(52) U.S. Cl.
CPC .......... *H04L 9/3242* (2013.01); *H04L 9/0825* (2013.01); *H04L 9/3252* (2013.01); *H04L 9/3297* (2013.01)

(58) Field of Classification Search
None
See application file for complete search history.

(56) References Cited

U.S. PATENT DOCUMENTS

| | | | | |
|---|---|---|---|---|
| 9,367,327 B2 * | 6/2016 | Swanson | ............... | G06F 21/575 |
| 10,430,241 B2 | 10/2019 | Joshi et al. | | |
| 2007/0186105 A1 * | 8/2007 | Bailey | ................... | H04L 9/3234 |
| | | | | 713/168 |
| 2007/0226377 A1 | 9/2007 | Jreij et al. | | |
| 2012/0195322 A1 * | 8/2012 | Ramanujam | .......... | H04L 47/629 |
| | | | | 370/413 |
| 2015/0193620 A1 | 7/2015 | Khatri et al. | | |
| 2017/0163607 A1 * | 6/2017 | Skuratovich | ........ | H04L 65/1046 |
| 2017/0177504 A1 * | 6/2017 | Desai | .................. | G06F 12/1408 |
| 2017/0329612 A1 * | 11/2017 | Ragupathi | ............. | G06F 9/4416 |
| 2020/0193408 A1 * | 6/2020 | Hadley | .............. | G06Q 20/3821 |
| 2020/0389315 A1 | 12/2020 | Dambal et al. | | |
| 2021/0176065 A1 * | 6/2021 | Osaki | ...................... | G06F 21/80 |
| 2021/0373909 A1 * | 12/2021 | Zimmermann | ......... | G06F 21/31 |
| 2022/0284088 A1 * | 9/2022 | Peng | ....................... | G06F 21/44 |
| 2022/0405391 A1 * | 12/2022 | Liu | ....................... | G06F 21/572 |

* cited by examiner

*Primary Examiner* — Bassam A Noaman

(74) *Attorney, Agent, or Firm* — Larson Newman, LLP

(57) ABSTRACT

An information handling system includes a BIOS and a service processor. The BIOS may generate, during a POST, a secret key that includes a symmetric key and a HMAC key and transmits the secret key to the service processor via an high-speed communication interface. After the POST, the BIOS transmits an SMI message that includes an encrypted message and a first hash value of the encrypted message. The encrypted message is encrypted using the symmetric key and the first hash value of the encrypted message is calculated using the HMAC key. The service processor calculate a second hash value of encrypted message based on the HMAC key and verify the encrypted message by comparing the first hash value and the second hash value. After a successful verification, the service processor decrypts the encrypted message and transmits a response to the BIOS.

18 Claims, 5 Drawing Sheets

SECURE HIGH-SPEED COMMUNICATION INTERFACE BETWEEN A BASIC INPUT AND OUTPUT SYSTEM AND A SERVICE PROCESSOR

FIELD OF THE DISCLOSURE

The present disclosure generally relates to information handling systems, and more particularly relates to secure high-speed communication interface between a basic input and output system and a service processor.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a basic input and output system and a service processor. The basic input and output system is configured to generate, during a power-on self-test, a secret key that includes a symmetric key and a hash-based message authentication code key. The basic input and output system transmits the secret key to a service processor via a high-speed communication interface. After the power-on self-test, the basic input and output system transmits a system management interrupt message that includes an encrypted message and a first hash value of the encrypted message via the high-speed communication interface, wherein the encrypted message is encrypted using the symmetric key and the first hash value of the encrypted message is calculated using the hash-based message authentication code key of the secret key. The service processor is configured to calculate a second hash value of encrypted message based on the hash-based message authentication code key. The service processor may also verify the encrypted message by comparing the first hash value and the second hash value. After a successful verification that the first hash value is equal to the second hash value, the service processor decrypts the encrypted message using the symmetric key and transmits a response to the basic input and output system via the high-speed communication interface.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
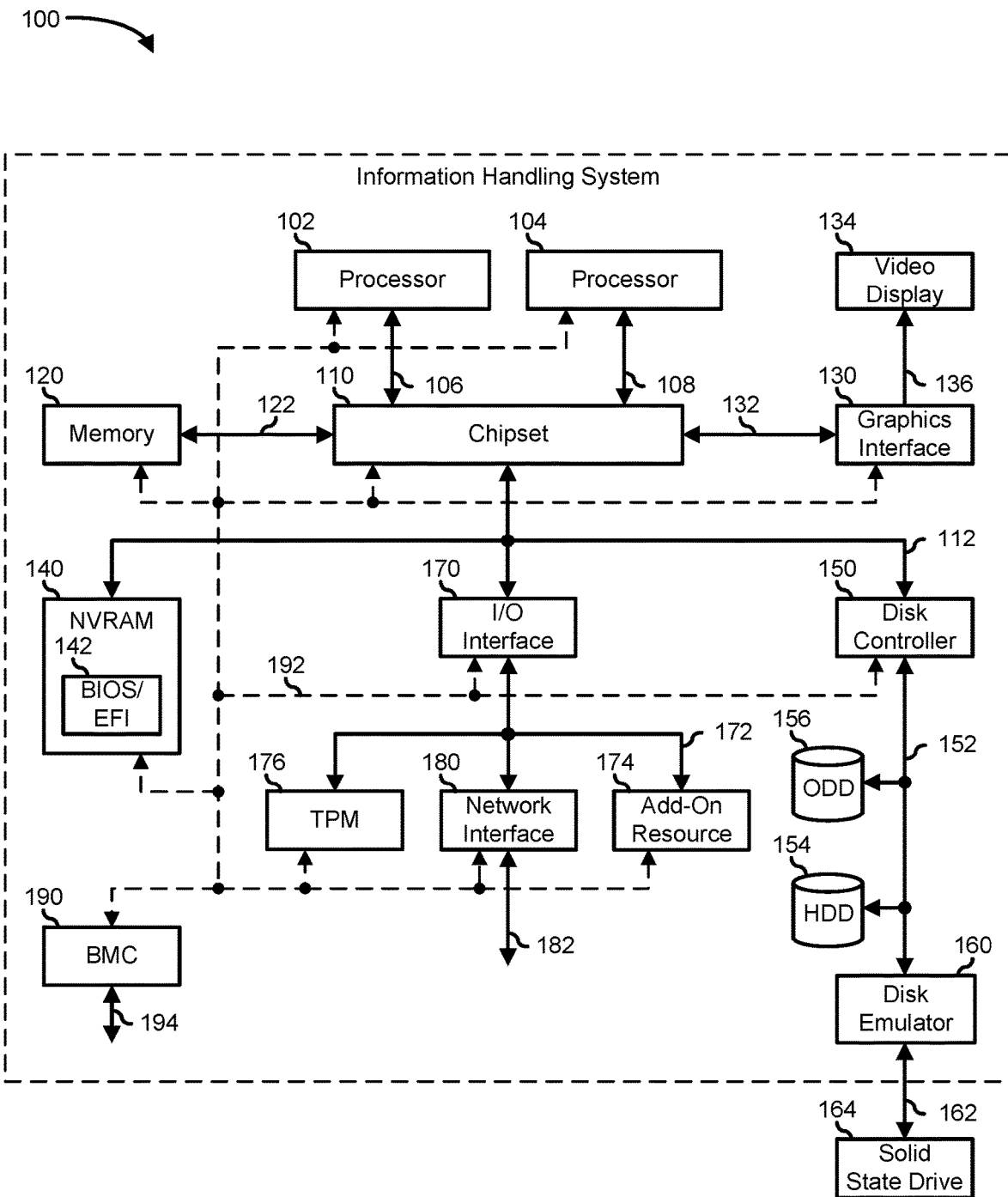
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system /extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

A high-speed communication interface is a data transfer channel between the BIOS and a service processor. The high-speed communication interface uses a shared memory interface and has several advantages over a keyboard controller style (KCS) interface. For example, the high-speed communication interface can transfer large chunks of data while reducing the number of interrupts processed by the service processor. Also, using the high-speed communication interface reduces the number of failure points from commands such as original equipment manufacturer (OEM) commands of the service processor. In addition, using the high-speed communication interface instead of the KCS interface improves the overall performance of communications between the BIOS and the service processor.

To mitigate security issues, typically the high-speed communication interface is disabled at runtime which isolates the service processor from the host Peripheral Component Interconnect (PCI) and memory space. This isolates the service processor from the host PCI and memory space so that a compromise in one subsystem remains isolated. However, without such a high-speed data transfer channel at runtime, the BIOS and the service processor communication channel reverts to using the legacy KCS interface. This affects the performances of some features which typically use large chunks of data such as Dell® Memory Health Manager and intelligent platform management interface (IPMI) commands during system event log (SEL) in the BIOS system management interrupt (SMI) code. In addition, logging of telemetry data for the memory reliability, availability, and serviceability (RAS) subsystem at runtime may be hampered by the speed of the KCS interface. To address the above issues and other concerns, the present disclosure provides a system and method to secure the high-speed communication interface and allow it to remain enabled after power-on self-test (POST). Thereby, allowing efficient and secure communication between the BIOS and the service processor.

Figure 2:
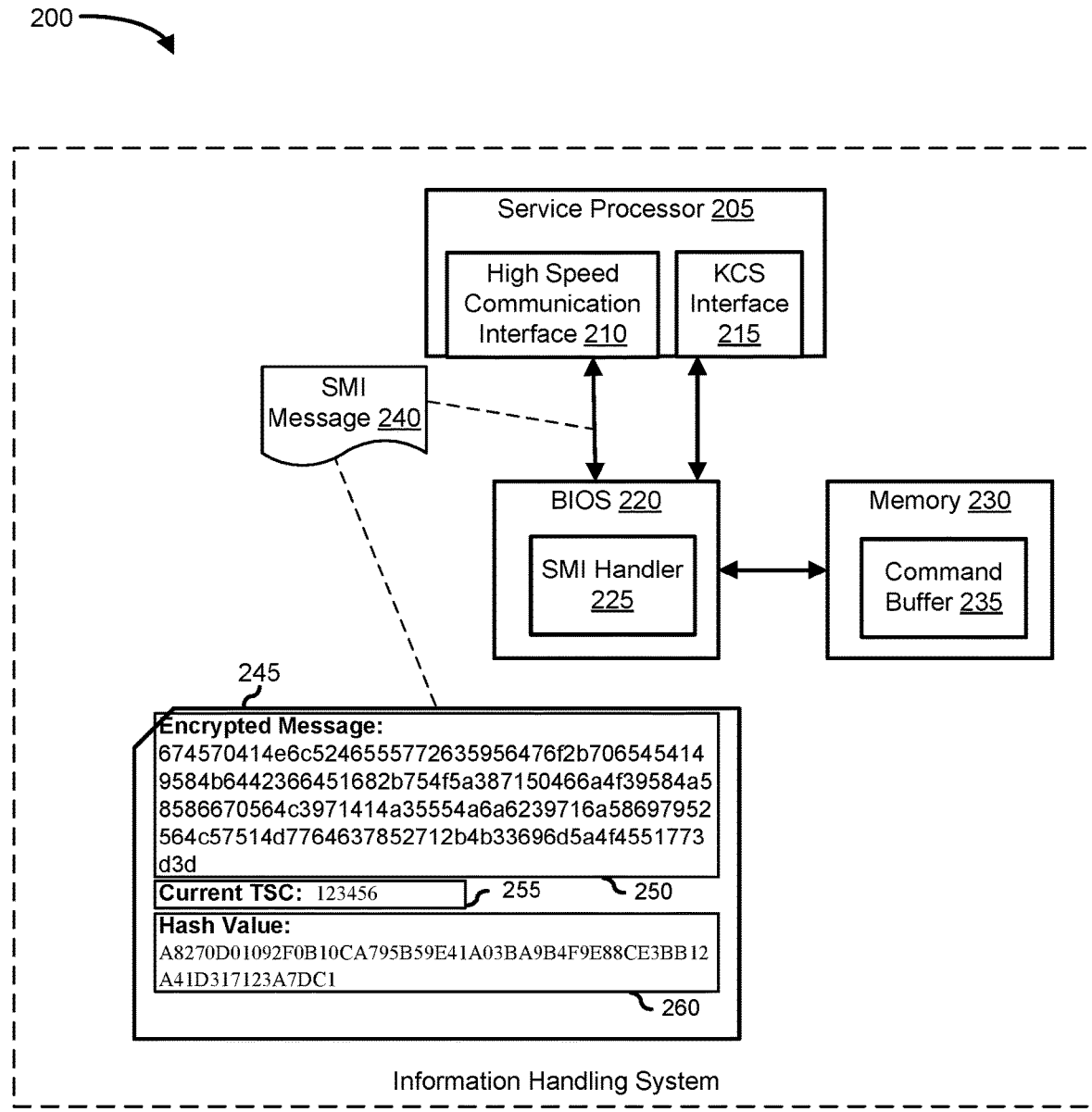
FIG. 2 is a block diagram illustrating an information handling system configured for a secure high-speed communication interface between a basic input and output system and a service processor, according to an embodiment of the present disclosure.

FIG. 2 illustrates an information handling system 200 with a secure high-speed communication interface between BIOS and a service processor. The high-speed communication interface may be a shared memory architecture (SMA) interface, system management interface chip (SMIC), block transfer (BT) or similar. Information handling system 200 is similar to information handling system 100 of FIG. 1 and includes a service processor 205, a BIOS 220, and a memory 230. Service processor 205 includes a high-speed communication interface 210 and a KCS interface 215. BIOS 220 includes an SMI handler 225. The components shown are not drawn to scale and information handling system 200 may include additional or fewer components which may be implemented in hardware, software, firmware, or any combination thereof. In addition, connections between components may be omitted for descriptive clarity.

Service processor 205 may also be referred to as a side-band processor, an out-of-band processor, a management controller, a BMC, and the like. An example of a service processor is the integrated Dell remote access controller (iDRAC). Service processor 205 can be configured to interface with BMC devices and can include a central processing unit, volatile and non-volatile memory device, a network interface controller, and the like. Service processor 205 can support one or more interface protocols to allow administrative personnel or other devices and processes to interact with it. For example, service processor 205 can operate in one or more non-standard or standard protocols such as command line interface (CLI), open manage server administrator (OMS), intelligent platform management interface (IPMI), remote access controller administrator (RACDAM), WSMAN, and the like.

In one embodiment, BIOS 220 can communicate with service processor 205 using secure IPMI commands over an IPMI data transfer channel using a high-speed communication interface, KCS interface 215, or the like. The boot process also referred herein as POST administered by BIOS 220 can be UEFI compliant and typically includes a sequence of phases including a security (SEC) phase, a pre-EFI initialization (PEI) phase, a driver execution environment phase (DXE) phase, and a boot device selection (BDS) phase.

At early POST before third-party code runs, BIOS 220 may generate a secret key and store it inside SMI handler 225 which is opaque to the operating system making the secret key secure. The secret key may be a random number or alphanumeric characters generated at each boot. Because the secret key is changed periodically, this can limit the number of messages being sent with the same secret key reducing the likelihood that the current secret key can be obtained by breaking the encryption.

BIOS 220, in particular SMI handler 225, may then send the secret key to service processor 205. BIOS 220 can use the secret key to encrypt a message or command to service processor 205. Service processor 205 can decrypt the received message or command using the secret key. The secret key may include two parts: the first part is a symmetric key for SMA command/data encryption/decryption, and the second part is a hash-based message authentication (HMAC) key. The symmetric key may be a suitable symmetric key including stream or block ciphers. Example suitable symmetric key algorithms include the Advanced Encryption Standard (AES) cipher, Twofish symmetric key block cipher, Serpent symmetric key block cipher, Blowfish symmetric key block cipher, CASTS symmetric key block cipher, RC4 stream cipher, Triple Data Encryption Algorithm (3DES) block cipher, International Data Encryption Algorithm (IDEA) symmetric key block cipher or other similar symmetric key algorithms. In one example, the symmetric key may be a 128-bit AES symmetric key. The HMAC key may be used to authenticate a message or request from BIOS 220. A cryptographic hash function such as a secure hash algorithm 2 (SHA-2) or secure hash algorithm 3 (SHA-3) may be used in calculating the HMAC key. In one example, the HMAC key may be a SHA-256 key. BIOS 220 can also send the current value of the CPU time stamp counter (TSC) or system monotonic counter during the secret key exchange.

At the end of POST, communication between BIOS 220 and service processor 205 may be transmitted using SMI messages, such as SMI message 240, issued by an SMI call. SMI message 240 includes a payload 245 that includes an encrypted message 250, a current TSC, and a hash value 260. Encrypted message 250 may be from the contents of a command buffer also referred to herein as an SMA buffer. The contents may be an SMA or IPMI command, a status indicator, or other data for transmission to service processor 205. The contents may be encrypted using the symmetric key. Hash value 260 is a cryptographic hash value of the encrypted message that is calculated using the HMAC key. Hash value 260 may be appended to encrypted message 250 for transmission to service processor 205. TSC value 255 or a system monotonic counter may be included in payload 245. In addition, TSC value 255 may also be included in calculating hash value 260. SMI message 240 may be transmitted from BIOS 220 to service processor 205 via high-speed communication interface 210.

Upon receipt of SMI message 240, service processor 205 may parse SMI message 240. Service processor 205 may calculate the hash value of the received encrypted message 250 using the HMAC key received earlier from BIOS 220 during the key exchange. Service processor 205 compares the hash value from its calculation with hash value 260 to verify the authenticity of encrypted message 250. Once the hash value is verified successfully, service processor 205 may use the symmetric key received earlier from BIOS 220 to decrypt encrypted message 250 and determine the command and/or data. Service processor 205 may also compare TSC value 255, which is the current TSC value, with the TSC value received during the secure key exchange before decrypting encrypted message 250. If the current TSC value is greater than the TSC value received earlier, then the encrypted message may be valid and service processor proceeds with decryption. If TSC value 255 is equal to or less than the TSC value received earlier than the command and/or data received may be a replay attack at which point service processor may generate an error. TSC 255 may also be included in encrypted message 250, wherein encrypted message may be decrypted prior to determining TSC whether TSC value 255 is equal to or less than TSC value received earlier.

Those of ordinary skill in the art will appreciate that the configuration, hardware, and/or software components of information handling system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
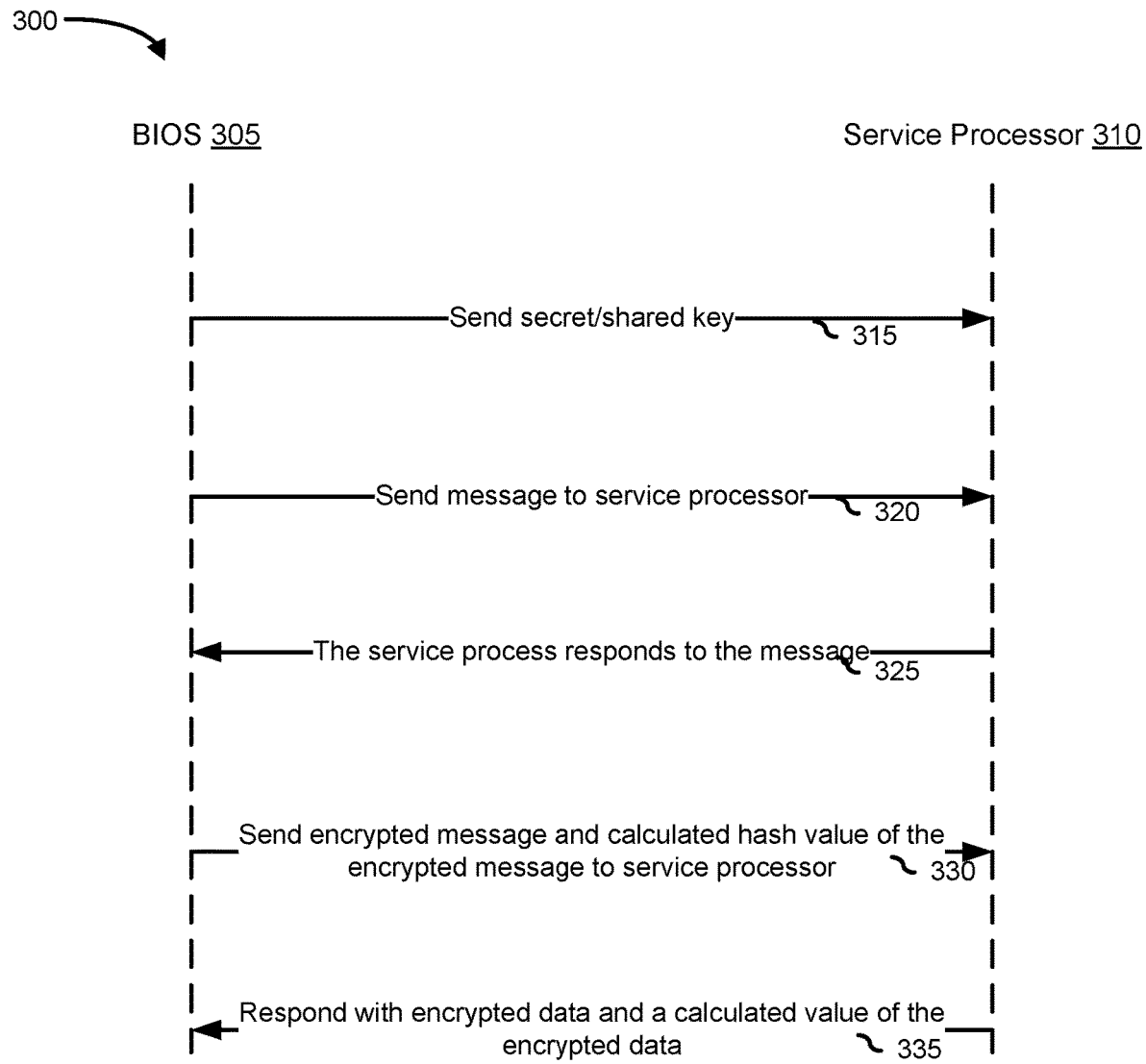
FIG. 3 is a flowchart illustrating an example of a method for a secure high-speed communication interface between a basic input and output system and a service processor, according to an embodiment of the present disclosure.

FIG. 3 illustrates a method 300 for a secure high-speed communication interface between bios and a service processor. Method 300 may be performed by BIOS 305 and service processor 310. BIOS 305 is similar to BIOS 220 and service processor 310 is similar to service processor 205 of FIG. 2. While embodiments of the present disclosure are described in terms of components similar to components of information handling system 200 of FIG. 2, it should be recognized that other systems may be utilized to perform the described method. One of skill in the art will appreciate that this flowchart explains a typical example, which can be extended to advanced applications or services in practice.

Method 300 typically starts at 315 which occurs during early POST before a third-party code is processed. BIOS 305 may generate a secret key which it shares with service processor 310 during system management mode (SMM). Service processor 310 may store the secret key in an SMM buffer. During POST at 320, BIOS 305 may send a message such as an SMA or IPMI command, status, or data to service processor 310 without encrypting the message. Similarly, at 325 service processor 310 may send an unencrypted response. The communication between BIOS 305 and service processor 310 during POST may not be encrypted even during SMM via a high-speed communication interface.

However, after POST such as at runtime, communication between BIOS 305 and service processor 310, such as at 330 and 335, may be performed via the high-speed communication interface. Such communication may be encrypted in both SMM and non-SMM. At 330, which occurs during SMM, BIOS 305 encrypts the contents of a buffer such as a SMA or command buffer using a symmetric key and calculates the corresponding message authentication code (MAC) or hash value using the HMAC key. At 335, service processor 310 may process the request or message received after verification and/or authentication of the request or message. Service processor 310 may calculate the MAC or the hash value using the HMAC key and check if the MAC or the hash value is identical to the other MAC or the other hash value from BIOS 305. Service processor 310 may also determine if the TSC included in the encrypted SMA buffer received is greater than a previous TSC received during the key exchange or the last message or request from BIOS 305 to prevent a replay attack. Service processor 310 may respond to BIOS 305 with encrypted data and a calculated hash value of the encrypted data. Service processor 310 may also append a current TSC to the encrypted data and the calculated hash value.

Figure 4:
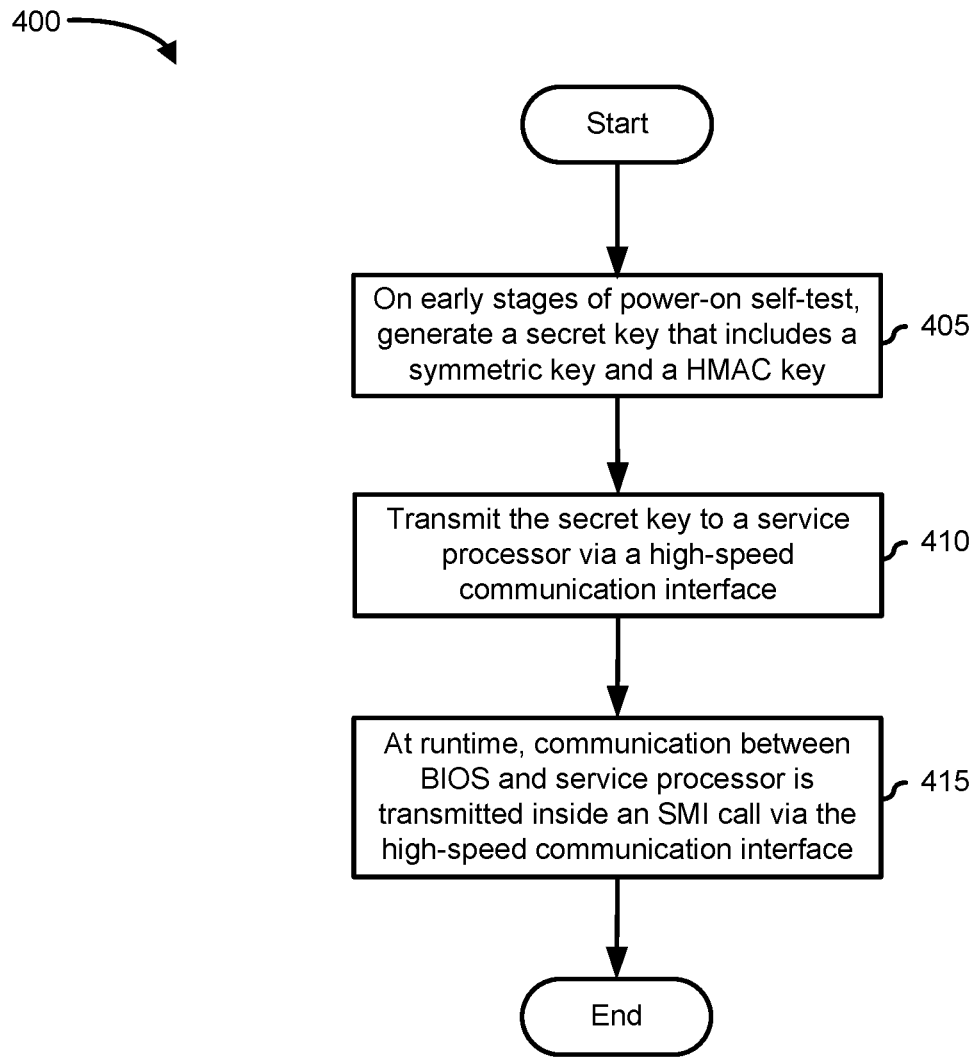
FIG. 4 is a flowchart illustrating an example of a method for a secure high-speed communication interface between a basic input and output system and a service processor, according to an embodiment of the present disclosure.

FIG. 4 illustrates a method 400 for a secure high-speed communication interface between BIOS and a service processor. Method 400 may be performed by BIOS 220 of FIG. 2. While embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

Method 400 typically starts at block 405, where during the early stages of POST, the BIOS generates a secret key that includes a symmetric key and a HMAC key for encryption/decryption of communication between the BIOS and the service processor. The communication may be transmitted via a high-speed communication interface.

At block 410, while still at the early stages of POST, the method transmits the secret key to the service processor via the high-speed communication interface. The method proceeds to block 415, where at runtime, the communication between the BIOS and the service processor is transmitted inside an SMI message at SMM via the high-speed communication interface.

Figure 5:
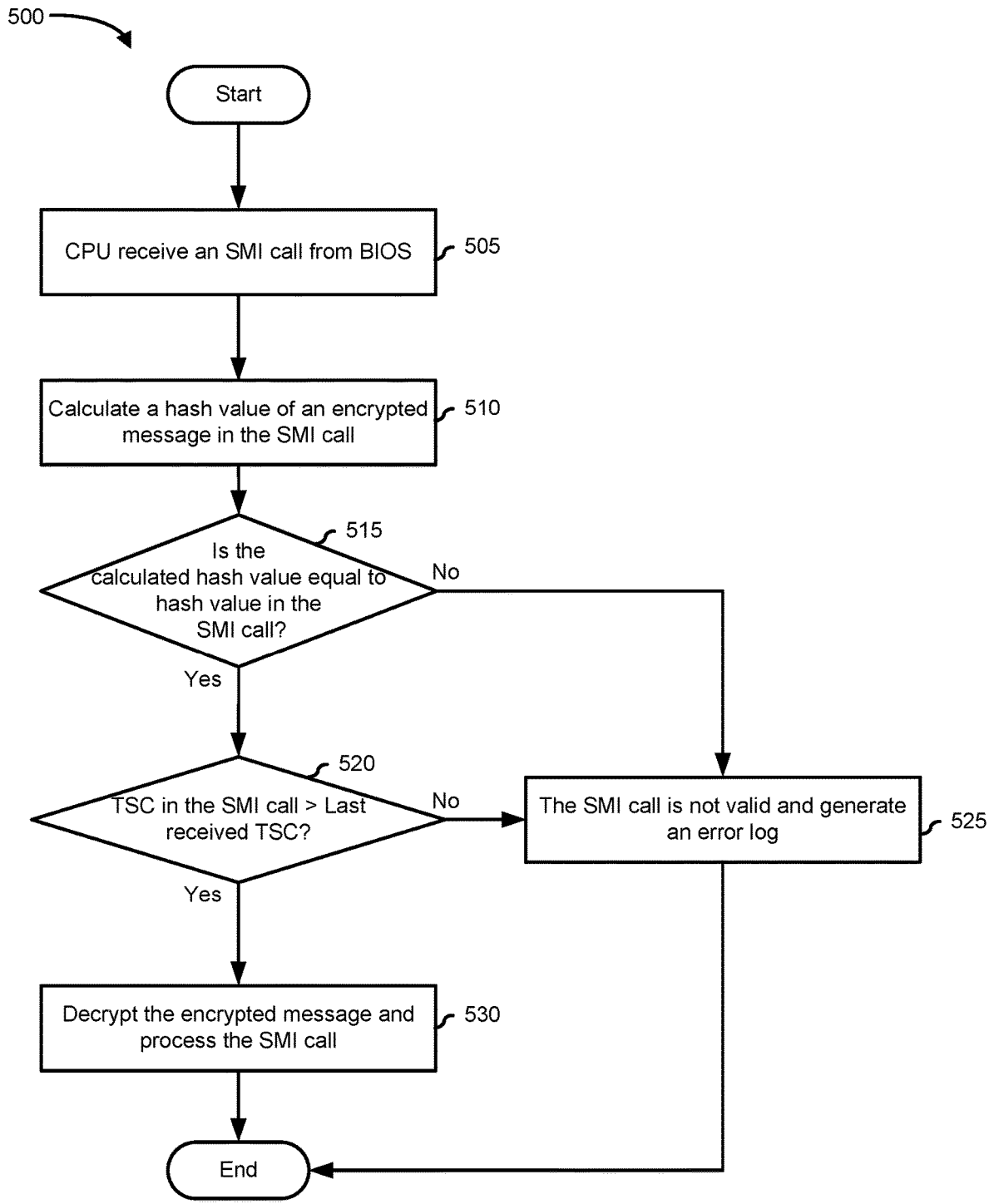
FIG. 5 is a flowchart illustrating an example of a method for a secure high-speed communication interface between a basic input and output system and a service processor, according to an embodiment of the present disclosure.

FIG. 5 illustrates a method 500 for a secure high-speed communication interface between BIOS and a service processor. Method 500 may be performed by service processor 205 of FIG. 2. While embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

Method 500 typically starts at block 505 where the CPU receives an SMI message from BIOS. The SMI call may issue the SMI message that includes a payload with an encrypted message which may be an SMA or IPMI command. The payload also includes a TSC, and a hash value of the encrypted message. The method proceeds to block 510 where the service processor calculates a hash value of the received encrypted message in the SMI message that was transmitted through a high-speed communication interface. The method proceeds to decision block 415 where the method compares the calculated hash value at block 510 and the hash value in the received SMI message. If the calculated hash value is equal to the hash value in the received SMI message, then the "YES" branch is taken and the method proceeds to decision block 520. If the calculated hash value is not equal to the hash value in the received SMI message, then the "NO" branch is taken and the method proceeds to block 525.

At decision block 520, the method compares the TSC in the received SMI message with the latest TSC received from the BIOS during the shared key exchange. The latest received TSC may be the TSC received during the shared key exchange. The latest received TSC may be the TSC from the latest SMI message. If the TSC is greater than the last received TSC, then the "YES" branch is taken and the method proceeds to block 530. If the TSC is not greater than the last received TSC, then the "NO" branch is taken and the method proceeds to block 525. At block 525, the method determines that the SMI message is not valid based on the results of decision block 515 and/or decision block 520. The method then generates an error log.

Although FIG. 3, FIG. 4, and FIG. 5 show example blocks of method 300, method 400, and method 500 in some implementation, method 300, method 400, and method 500 may include additional blocks, fewer blocks, different blocks, or differently arranged blocks than those depicted in FIG. 3, FIG. 4, and FIG. 5. Additionally, or alternatively, two or more of the blocks of method 300 and method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
  a basic input/output system (BIOS) configured to:
    generate, during a power-on self-test, a secret key that includes a symmetric key and a hash-based message authentication code key, wherein the secret key is stored in a system management interrupt handler;
    transmit, during the power-on self-test, the secret key to a service processor via a high-speed communication interface; and
    subsequent to the power-on self-test, transmit a system management interrupt message that includes an encrypted message and a first hash value of the encrypted message via the high-speed communication interface, wherein the encrypted message is encrypted using the symmetric key and the first hash value of the encrypted message is calculated using the hash-based message authentication code key of the secret key; and
  the service processor configured to:
    receive the system management interrupt message from the BIOS;
    calculate a second hash value of encrypted message based on the hash-based message authentication code key;
    verify the encrypted message by comparing the first hash value and the second hash value;
    subsequent to a successful verification that the first hash value is equal to the second hash value, decrypt the encrypted message using the symmetric key; and
    transmit a response to the BIOS via the high-speed communication interface.

2. The information handling system of claim 1, wherein the BIOS is further configured to transmit a first time stamp counter with the secret key and a second time stamp counter with the encrypted message.

3. The information handling system of claim 2, wherein the service processor is further configured to validate that the second time stamp counter is greater than the first time stamp counter.

4. The information handling system of claim 1, wherein the service processor is further configured to decrypt the encrypted message before a successful validation of a second time stamp counter included in the system management interrupt message.

5. The information handling system of claim 1, wherein the system management interrupt message includes a time stamp counter.

6. The information handling system of claim 1, wherein the service processor is further configured to generate an error log if the system management interrupt message is not valid.

7. A method comprising:
  during a power-on self-test, generating, by a basic input/output system (BIOS), a secret key that includes a symmetric key and a hash-based message authentication code key and sending the secret key to a service processor via a high-speed communication interface, wherein the secret key is stored in a system management interrupt handler;
  subsequent to the power-on self-test, transmitting, by the BIOS, a system management interrupt message that includes an encrypted message and a hash value of the encrypted message via the high-speed communication interface, wherein the encrypted message is encrypted using the symmetric key and the hash value of the encrypted message is calculated using the hash-based message authentication code key;
  receiving, by the service processor, the system management interrupt message from the BIOS;

calculating, by the service processor, a second hash value of encrypted message based on the hash-based message authentication code key;
verifying, by the service processor, the encrypted message by comparing a first hash value and the second hash value;
subsequent to a successful verification that the first hash value is equal to the second hash value, decrypting, by the service processor, the encrypted message using the symmetric key; and
transmitting, by the service processor, a response to the BIOS via the high-speed communication interface.

8. The method of claim 7, further comprising:
transmitting, by the BIOS, a first time stamp counter with the secret key and a second time stamp counter with the encrypted message.

9. The method of claim 8, further comprising:
validating, by the service processor, that the second time stamp counter is greater than the first time stamp counter.

10. The method of claim 7, further comprising:
decrypting the encrypted message before a successful validation of a second time stamp counter included in the system management interrupt message.

11. The method of claim 7, further comprising:
receiving, by the BIOS, the response to the system management interrupt message from the service processor via the high-speed communication interface.

12. The method of claim 7, further comprising:
generating an error log when the system management interrupt message is not valid.

13. A non-transitory computer-readable medium to store instructions that are executable to perform operations comprising:
during a power-on self-test, generating, by a basic input/output system (BIOS), a secret key that includes a symmetric key and a hash-based message authentication code key and sending the secret key to a service processor via a high-speed communication interface, wherein the secret key is stored in a system management interrupt handler;
subsequent to the power-on self-test, transmitting, by the BIOS, a system management interrupt message that includes an encrypted message and a hash value of the encrypted message via the high-speed communication interface, wherein the encrypted message is encrypted using the symmetric key and the hash value of the encrypted message is calculated using the hash-based message authentication code key;
receiving, by the service processor, the system management interrupt message from the BIOS;
calculating, by the service processor, a second hash value of encrypted message based on the hash-based message authentication code key;
verifying, by the service processor, the encrypted message by comparing a first hash value and the second hash value;
subsequent to a successful verification that the first hash value is equal to the second hash value, decrypting, by the service processor, the encrypted message using the symmetric key; and
transmitting, by the service processor, a response to the BIOS via the high-speed communication interface.

14. The non-transitory computer-readable medium of claim 13, wherein the operations further comprise transmitting, by the BIOS, a first time stamp counter with the secret key and a second time stamp counter with the encrypted message.

15. The non-transitory computer-readable medium of claim 14, wherein the operations further comprise validating, by the service processor, that the second time stamp counter is greater than the first time stamp counter.

16. The non-transitory computer-readable medium of claim 13, wherein the operations further comprise decrypting the encrypted message before a successful validation of a second time stamp counter included in the system management interrupt message.

17. The non-transitory computer-readable medium of claim 13, wherein the operations further comprise receiving, by the BIOS, the response to the system management interrupt message from the service processor via the high-speed communication interface.

18. The non-transitory computer-readable medium of claim 13, wherein the operations further comprise generating an error log when the system management interrupt message is not valid.

* * * * *